United States Patent [19]
Yokoyama et al.

[11] Patent Number: 5,695,029
[45] Date of Patent: Dec. 9, 1997

[54] SHIFT LEVER DEVICE

[75] Inventors: Yoshinobu Yokoyama; Shoichi Harada; Etsuo Shimizu, all of Aichi-ken, Japan

[73] Assignee: Kabushiki Kaisha Tokai-Rika-Denki-Seisakusho, Aichi-ken, Japan

[21] Appl. No.: 324,610

[22] Filed: Oct. 18, 1994

[30] Foreign Application Priority Data

Oct. 20, 1993 [JP] Japan ................ 5-262419

[51] Int. Cl.⁶ .................................... B60K 41/26
[52] U.S. Cl. ............................ 192/4 A; 74/48.3 R
[58] Field of Search ................... 192/4 A, 4 C, 192/9; 74/336 R, 475, 473 P, 471 XY, 483 R

[56] References Cited

U.S. PATENT DOCUMENTS

| 4,942,937 | 7/1990 | Amberger et al. ............ 192/4 A X |
| 5,027,931 | 7/1991 | Radke et al. ................. 192/9 |

FOREIGN PATENT DOCUMENTS

| 64-28030 | 1/1989 | Japan | ................ 192/4 A |
| 2-48434 | 4/1990 | Japan. | |
| 2-138266 | 11/1990 | Japan. | |
| 4-307162 | 10/1992 | Japan. | |

*Primary Examiner*—Richard M. Lorence
*Attorney, Agent, or Firm*—Sixbey, Friedman, Leedom & Ferguson, P.C.; Thomas W. Cole; Eric J. Robinson

[57] ABSTRACT

A gate-type shift lever device having a stopper which is disposed so as to prevent the movement of a shift lever positioned in one of the P shift range and N shift range and which, in this case, prevents the movement of the shift lever positioned in the P shift range to other shift ranges than the P shift range, and the movement of the shift lever positioned in the N shift range to the R shift range. This makes it possible to reliably set a shift lever in a shift lock state under a specific condition without effecting a pushing operation of a shift lever knob and by a simple structure.

22 Claims, 9 Drawing Sheets

SHIFT LEVER DEVICE

BACKGROUND OF THE INVENTION

1. Field of the Invention

The present invention relates to a shift lever device for shift-operating a transmission of a vehicle.

2. Description of the Related Art

Recently, an automatic transmission of a vehicle has been designed as a multi-stage transmission system and has a tendency to set a large number of shift ranges. For this reason, there has been a demand for a shift lever device which can select any of these set plurality of shift ranges.

Here, a shift lever device for shift-operating an automatic transmission of a vehicle generally shifts the automatic transmission by shitting a shift lever in a longitudinal direction of the vehicle. However, when this conventional shift lever device is applied to the above-described automatic transmission in which a large number of shift ranges are set, there was a limit with respect to a positioning space (i.e., a range of operating and moving the shift lever) and maneuverability. Accordingly, there has been proposed a shift lever device which selects a shift position by shifting the shift lever not only in the longitudinal direction of the vehicle, but also in a transverse direction thereof, i.e., a so-called gate-type (zigzag-operating) shift lever device.

In this type of zigzag-operating shift lever device, even when it is applied to an automatic transmission in which a plurality of shift ranges are set, it becomes possible to select any of the plurality of shift ranges in a compact space (i.e., the range of operating and moving the shift lever) and the zigzag-operating shift lever device can correspond to an increase in number of shift ranges to be set.

Meanwhile, the above-described zigzag-operating shift lever device is constructed in that the direction in which the shift lever is operated is merely set in the longitudinal and transverse directions of the vehicle (i.e., in a zigzag manner). For example, when the shift lever is selectively positioned at an N shift range, the shift lever can be shifted to an R shift range by a two-step operation of moving the shift lever in the transverse direction of the vehicle and subsequently moving it in a forward direction of the vehicle.

In this case, there has also been proposed a shift lever device which is constructed in that, when the shift lever is shifted to the R shift range, the shifting operation of the shift lever to the R shift range is prevented unless a shift lever knob is pushed in. However, this type of shift lever device requires a pushing operation of the shift lever knob when the shift lever is shifted to the R shift range.

SUMMARY OF THE INVENTION

In view of the aforementioned, it is an object of the present invention to provide a shift lever device which can reliably set a shift lever in a shift lock state under a specific condition without effecting a pushing operation of the shift lever and by a simple structure.

In accordance with the present invention, there is provided a shift lever device which is used for a transmission having a P shift range, R shift range, N shift range, D shift range, L shift range, and at least one intermediate shift range provided between the D shift range and the L shift range, comprising: a shift lever connected to the transmission and operated in longitudinal and transverse directions of a vehicle so as to be selectively moved to any one of the plurality of shift ranges and shift-operate the transmission; a stopper disposed so as to prevent the movement of the shift lever positioned in any one of the P and N shift ranges, in the state in which the movement of the shift lever is prevented, the stopper preventing the movement of the shift lever positioned in the P shift range to other shift ranges than the P shift range and the movement of the shift lever positioned in the N shift range to the R shift range; and an actuator connected to the stopper, when the shift lever is selectively moved to the P shift range, the actuator operating by a brake operation and moving the stopper to a position in which the shift lever positioned in the P shift range is released from a shift lock state, and when the shift lever is selectively moved to any range between the N shift range and the L shift range, the actuator operating at a predetermined vehicle speed set in accordance with each shift range between the N shift range and the L shift range and moving the stopper to a position in which the movement of the shift lever positioned in the N shift range can be prevented.

In the above-described shift lever device, the stopper is moved to a position in which the movement of the lever cannot be prevented when the actuator operates.

Namely, when the lever is selectively moved to the P shift range, the stopper is set in a state in which the movement of the lever positioned in the P shift range can be prevented. As a result, the lever cannot be moved to other shift ranges than the P shift range so as to be set in a shift lock state. Meanwhile, in this case, when brakes are applied, the actuator operates and the stopper is moved to a position in which the lever positioned in the P shift range is released from being the shift lock state. Accordingly, the lever can move to other shift ranges than the P shift range so as to be set in a shift lock-released state.

Further, in a case in which the lever is selectively moved to any range between the N shift range and the L shift range, the actuator operates at a predetermined vehicle speed set in accordance with each range between the N shift range and the L shift range, and the stopper is moved to a position in which the movement of the lever positioned in the N shift range can be prevented. As a result, the lever cannot be moved to the R shift range so as to be set in the shift lock state.

As described above, in a specific shift range, when the actuator operates by a brake operation or in accordance with a set vehicle speed, the stopper is moved so that the lever is set in a locked state in which the lever cannot move, or a lock released state. Namely, it is possible to set the lever in the shift lock state by a simple structure using a single actuator without impairing maneuverability of the lever which is operated in the longitudinal and transverse directions of the vehicle, i.e., without requiring other particular operation.

As described above, the shift lever device of the present invention offers an outstanding advantage in that it make it possible to reliably set a shift lever in a shift lock state under a specific condition without effecting a pushing operation of a shift lever knob and by a simple structure.

DESCRIPTION OF THE PREFERRED EMBODIMENTS

Figure 1:
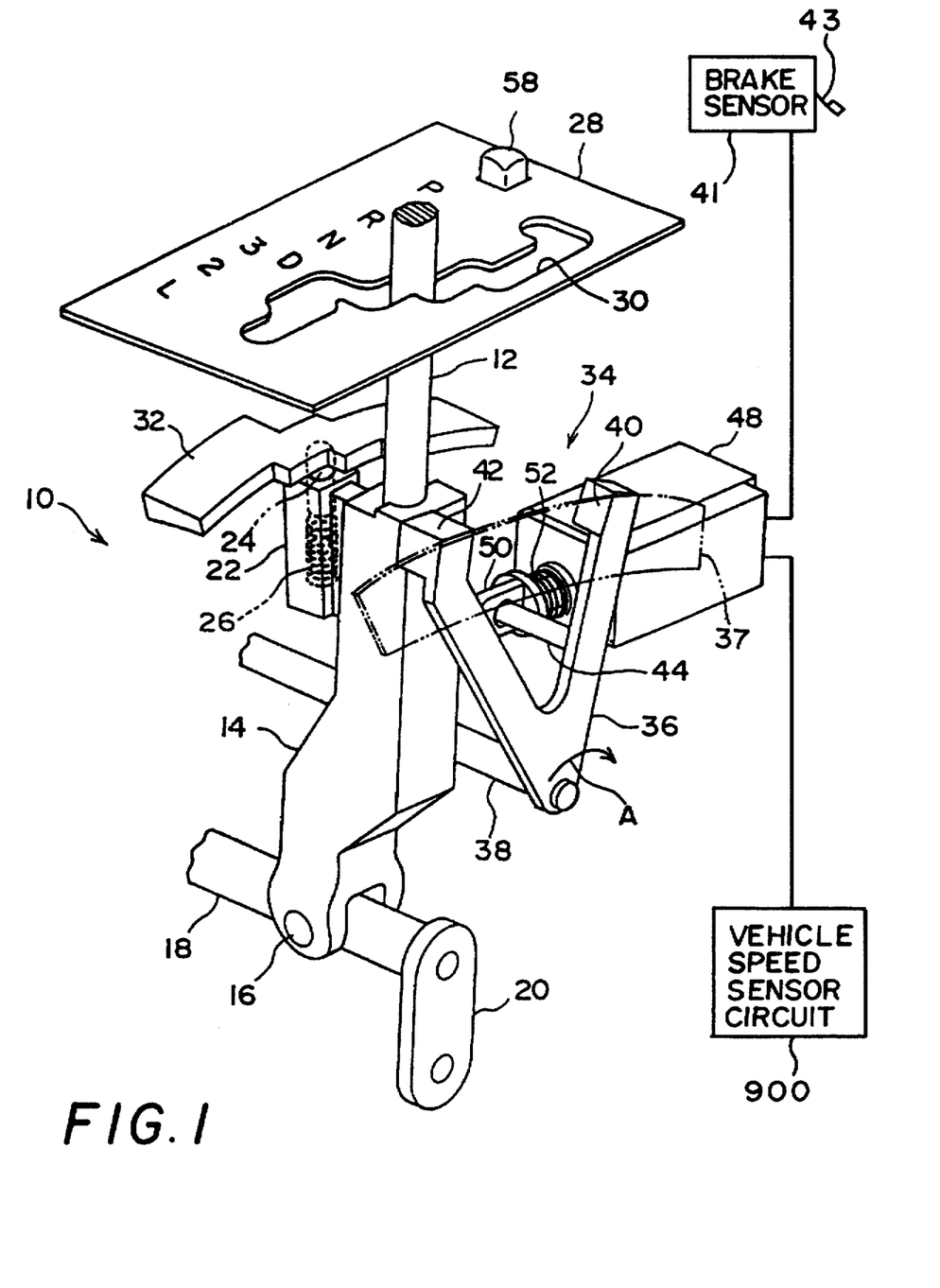
FIG. 1 is a perspective view illustrating a structure of a main portion of a shift lever device according to a first embodiment of the present invention.
Figure 2:
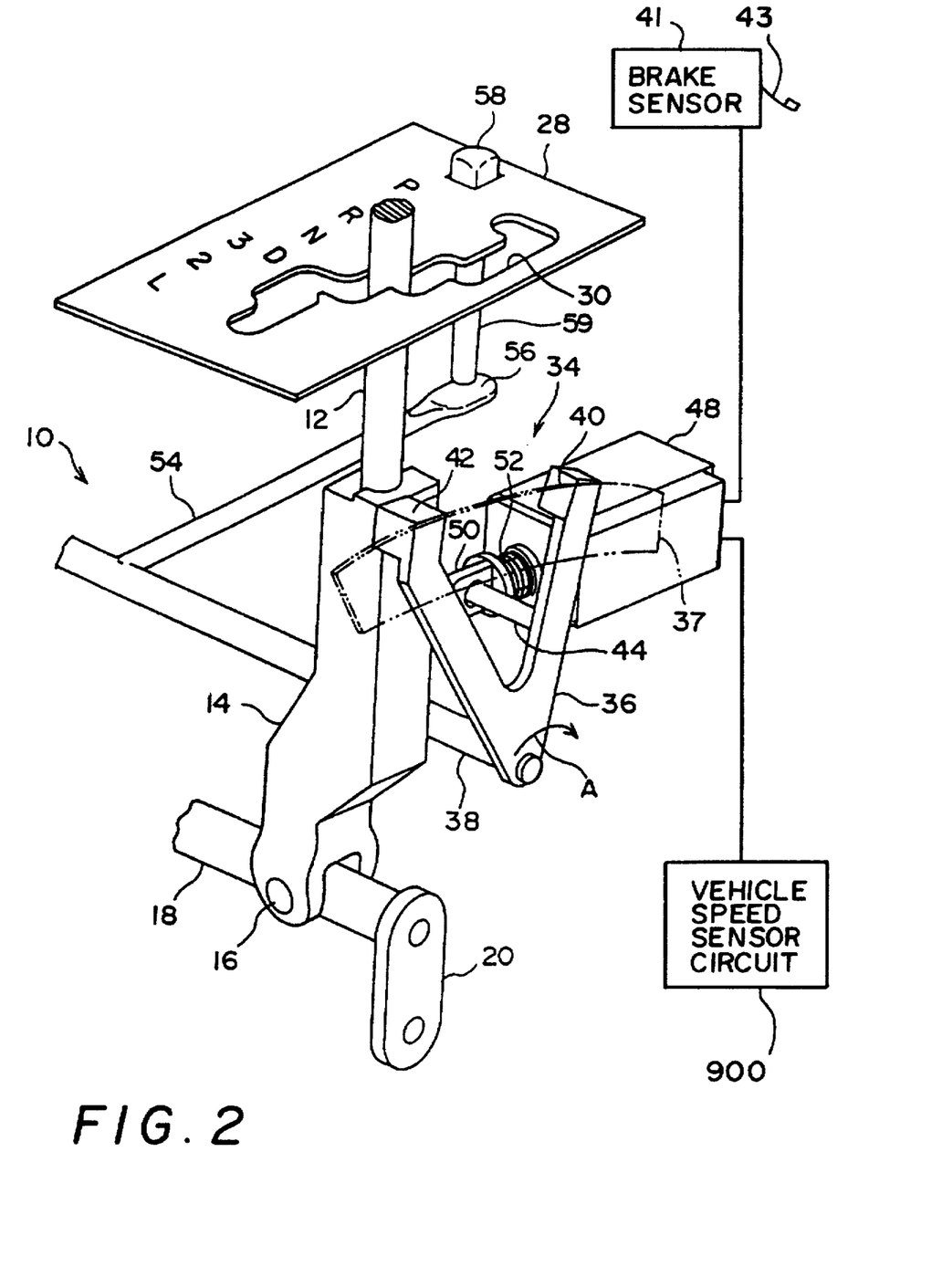
FIG. 2 is a perspective view illustrating a structure of a main portion of the shift lever device according to the first embodiment of the present invention.

FIG. 1 and FIG. 2 are perspective views of main portions of a shift lever device 10 relating to a first embodiment of the present invention. Several of the parts are illustrated in both of these drawings.

In the shift lever device 10, a shift lever 12 is formed integrally with a block 14 and projects upwardly from the top end portion thereof. The lower end portion of the block 14 is attached to a shaft 18 by a pin 16 so as to be freely rotatable. Therefore, the shift lever 12 can freely rotate together with the shaft 18 around the axis of the shaft 18, and can freely rotate around the pin 16 as well. A link 20 is fixed to the end portion of the shaft 18. The other end portion of the link 20 is connected to an unillustrated automatic transmission via a rod or the like.

A bracket 22 is formed integrally with and fixed to a side portion of the block 14. A moderation pin 24 and a spring 26 are accommodated within the bracket 22. The moderation pin 24 projects in such a manner as to be urged upwardly.

The shift lever 12 having the above-described structure enters a guide hole 30 formed in a plate 28.

Figure 3:
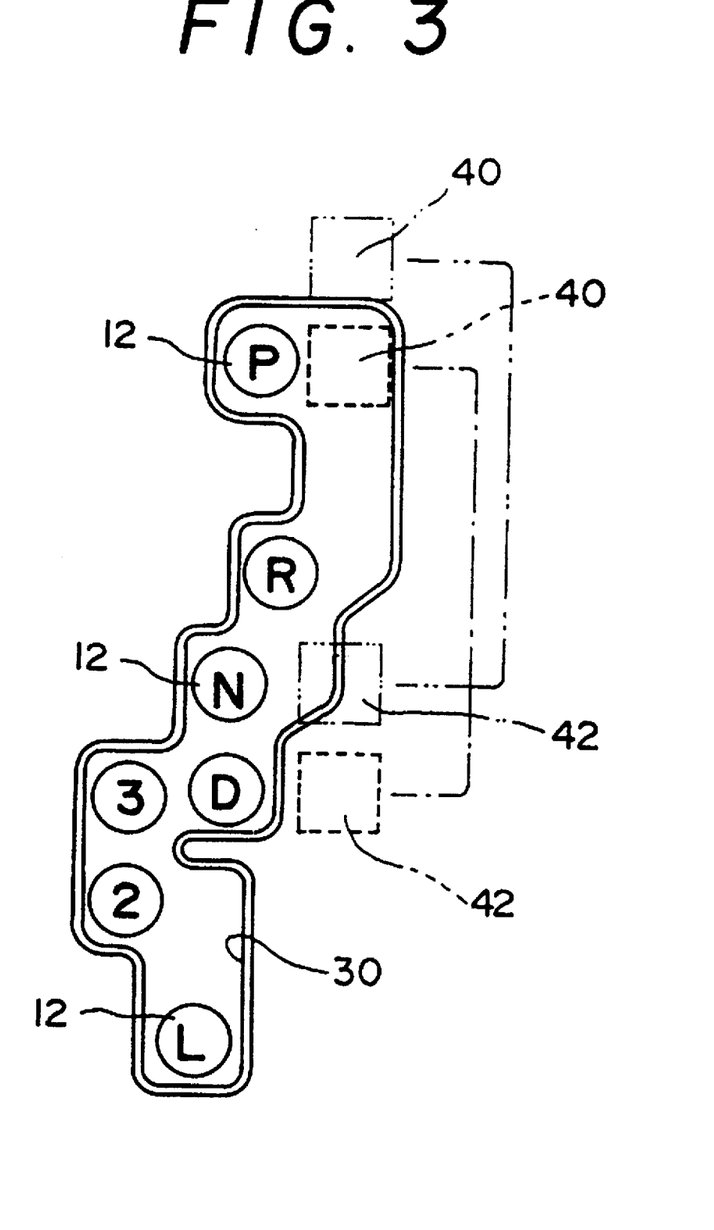
FIG. 3 is a plan view illustrating a correspondence relationship between a shift lever, guide hole and stopper link of the shift lever device according to the first embodiment of the present invention.

As illustrated in FIG. 3 in detail, a guide hole 30 is formed so as to lie in a zigzag line (i.e., concave and convex portions are continuously formed into the guide hole). The shift lever 12 is operated in the longitudinal and transverse directions of a vehicle along the Guide hole 30 (i.e., in a zigzag line) so as to be shifted.

Meanwhile, the moderation pin 24 accommodated within the bracket 22 enters a moderation groove formed on a reverse side of a moderation plate 32. The moderation plate 32 (i.e., the moderation groove) is formed such that a circumferential wall thereof is bent to continuously form concave and convex surfaces, so as to correspond to each shift position of the shift lever 12, i.e., respective shift ranges of "P", "R", "N", "D", "3", "2" and "L". These concave and convex portions restrict the movement of the moderation pin 24 (i.e., the movement of the shift lever 12), and at the same time, leads the shift lever 12 to a specific shift range.

A locking device 34 is disposed in the vicinity of the block 14 of the shift lever 12.

The locking device 34 is provided with a stopper link 36. The stopper link 36 is formed into a substantially V-shaped configuration when seen from a side view. A base end portion of the V-shaped configuration is supported by a shaft 38 so as to be freely rotatable. Further, upper end portions of the V-shaped stopper link 36 respectively form a P engaging portion 40 and an N engaging portion 42. When the shift lever 12 is selectively moved to the P shift range, the P engaging portion 40 is positioned immediately near the block 14 so as to engage the block 14. Further, when the shift lever 12 is selectively moved to the N shift range, the N engaging portion 42 is positioned immediately near the block 14 so as to engage the block 14.

In a state in which the P engaging portion 40 of the stopper link 36 is positioned immediately near the block 14 when the shift lever 12 is selectively moved to the "P" shift range, the movement of the shift lever 12 positioned in the "P" shift range, to other shift ranges than the "P" shift range (i.e., the movement of the shift lever 12 in the direction of "R" shift range) can be prevented. Also, in a state in which the N engaging portion 42 of the stopper link 36 is positioned immediately near the block 14 when the shift lever 12 is selectively moved to the "N" shift range, the movement of the shift lever 12 positioned in the "N" shift portion, in the direction of the "R" shift range can be prevented.

It should be noted that the P engaging portion 40 and the N engaging portion 42 are simultaneously moved with each other so as to be brought into the above-described respective states. Each size or the like of the P engaging portion 40 and the N engaging portion 42 of the stopper link 36 is set in the following manner. Namely, in a state in which the P engaging portion 40 is positioned immediately near the block 14 in a case in which the shift lever 12 is selectively moved to the "P" shift range, the N engaging portion 42 is positioned immediately near the block 14 when the shift lever 12 is selectively moved to the "D" shift range (i.e., the N engaging portion 42 is separated from the shift lever 12 positioned in the "N" shift range). Meanwhile, in a state in which the N engaging portion 42 is positioned immediately near the block 14 in a case in which the shift lever 12 is selectively moved to the "N" shift range, the P engaging portion 40 is positioned apart from the block 14 in a forward direction of the block 14 (i.e., in an upper direction on the paper of FIG. 3) in a case in which the shift lever 12 is selectively positioned to the "P" shift range.

An arm 44 extends parallel to the shaft 38 from an intermediate portion of an extension on the side of the P engaging portion 40 of the stopper link 36. Further, a plunger 50 of a solenoid 48 which forms an actuator is connected to the arm 44. The solenoid 48 is adapted to attract the plunger 50 when electrical current is supplied to the solenoid 48. When electrical current is not supplied, the plunger 50 is pulled out by an urging force of a coiled return spring 52. When the solenoid 48 has been magnetized, the plunger 50 is attracted to the solenoid 48 against the urging force of the return spring 52, so that the stopper link 36 is rotated around the shaft 38 in the direction of arrow A in FIG. 1. Accordingly, when electrical current is not supplied to the solenoid 48, the P engaging portion 40 of the stopper link 36 is positioned immediately near the block 14 in a case in which the shift lever 12 is selectively moved to the "P" shift range, and the N engaging portion 42 is positioned immediately near the block 14 in a case in which the shift lever 12 is selectively moved to the "D" shift range. On the other hand, when electrical current is supplied to the solenoid 48 and the stopper link 36 is rotated in the direction of arrow A as described above, the P engaging portion 40 is positioned apart from the block 14 in the forward direction of the block 14 (i.e., in the upper direction on the paper of FIG. 3) in a case in which the shift lever 12 is selectively moved to the "P" shift range, and the N engaging portion 42 is positioned immediately near the block 14 in a case in which the shift lever 12 is selectively moved to the "N" shift range.

Figure 9:
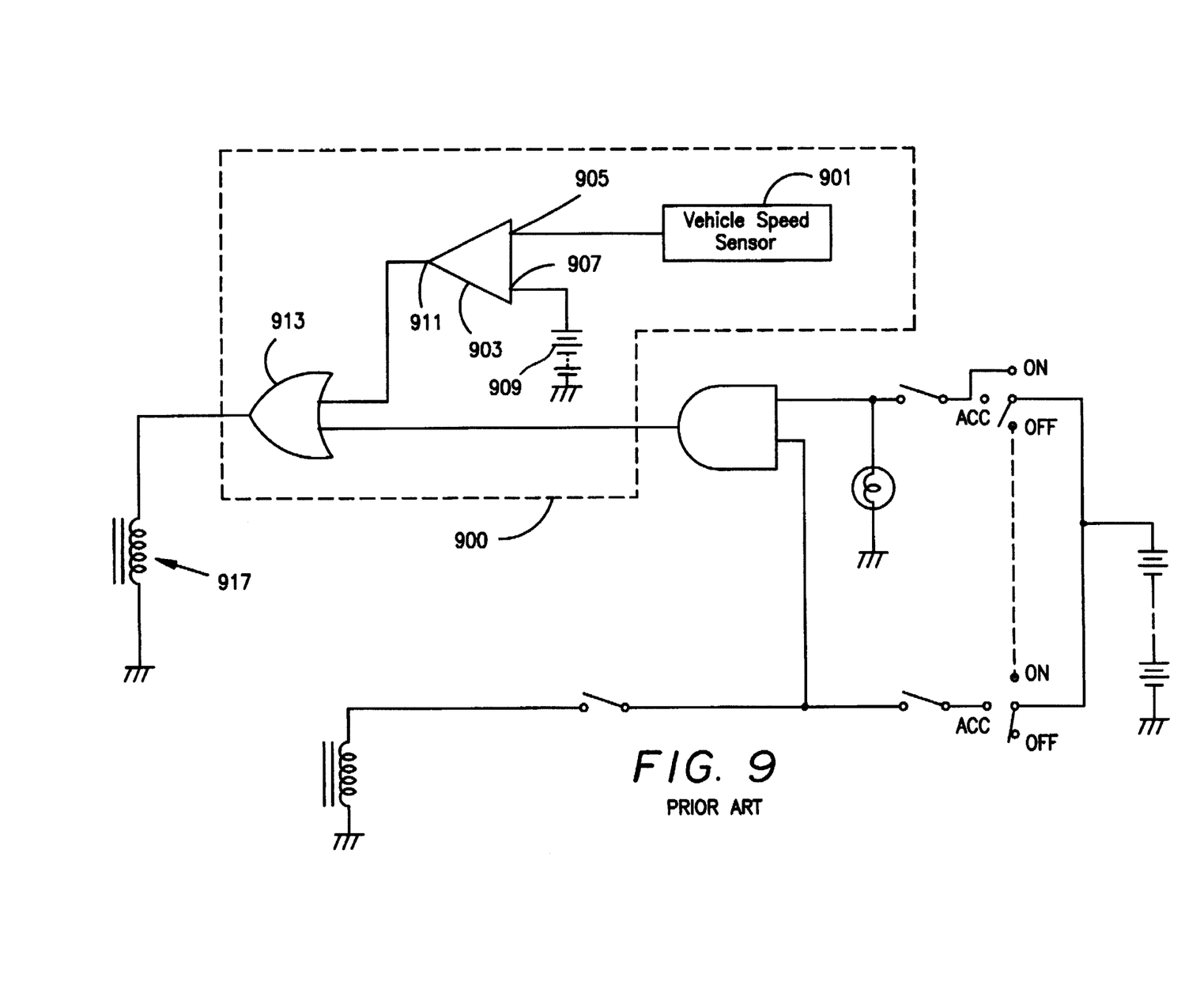
FIG. 9 illustrates a conventional vehicle speed sensing circuit that could be used in the connection with the present invention.

The solenoid 48 is adapted to be magnetized by energization and to be released from magnetization by electric control in accordance with a running condition of a vehicle. Concretely, when the shift lever 12 is selectively moved to the "P" shift range, the solenoid 48 operates by a brake operation in response to a signal from brake sensor 41 and brake actuating means 43. When the shift lever 12 is moved away from the "P" shift range, the solenoid 48 is stopped (released from magnetization). Further, in a case in which the shift lever 12 is selectively moved to any range between the shift range and the "L" shift range, the solenoid 48 is adapted to operate when a vehicle speed reaches a predetermined speed set in accordance with each of these shift ranges, and to be stopped (i.e., to be released from magnetization) when the vehicle speed becomes less than or equal to the predetermined speed. Referring to FIG. 9, vehicle speed sensing circuitry suitable for use in accordance with the present invention is shown. Vehicle speed sensing circuitry 900 includes vehicle speed sensor 901 connected to comparator 903 at a first input 905. Comparator 903 includes a second input 907 connected to a reference voltage source 909. Output 911 of comparator 903 is connected to OR gate 913, which produces output 915. Output 915 represents a vehicle speed signal indicative of the vehicle speed sensed by vehicle speed sensor 901. Output 915 is connected to solenoid 917 in FIG. 9. Of course, those skilled in the art will appreciate that solenoid 917 shown in FIG. 9 corresponds to solenoid 48 shown in FIGS. 1 and 2, solenoid 82 shown in FIG. 4, solenoid 112 shown in FIG. 6, and solenoid 282 shown in FIG. 7.

Also, the locking device 34 is provided with a forced release mechanism. Namely, as shown in FIG. 2, a rod 54 is integrally connected and secured to the shaft 38 which supports the stopper link 36. The leading end portion of the rod 54 is formed in a flat manner into a pressed portion 56 and faces a release rod 59 connected to a release button 58. Accordingly, when the release button 58 is pressed, the pressed portion 56 is pressed and the rod 54 is rotated together with the shaft 38, thereby causing the stopper link 36 to be forcedly rotated in the direction of arrow A in FIG. 2 against the urging force of the return spring 52.

Next, an operation of the first embodiment will be described.

In the shift lever device 10 having the above-described structure, when the shift lever 12 is operated within the guide hole 30 in lengthwise and crosswise directions of the guide hole 30, the moderation pin 24 is guided along a zigzag line of the moderation groove of the moderation plate 32 and moves moderately to a specific shift range in accordance with operation of the shift lever 12.

Further, when the shift lever 12 is positioned in a specific shift range or when the vehicle is running, the solenoid 48 operates and the stopper link 36 is moved to a position in which the stopper link 36 can engage the shift lever 12 (the block 14).

Namely, for example, when the shift lever 12 is selectively moved to the "P" shift range, the solenoid 48 is in a state in which electrical current is not supplied thereto. In this case, the P engaging portion 40 of the stopper link 36 is positioned immediately near the block 14 and the N engaging portion 42 is positioned apart from the "N" shift range (i.e., the state indicated by the broken line in FIG. 3).

Accordingly, the shift lever 12 is brought into a shift lock state in which the movement of the shift lever 12 from the "P" shift range to other shift ranges (i.e., the movement of the shift lever 12 in the direction of the "R" shift range) is prevented (which is referred to as P range shift lock).

On the other hand, when an ignition switch of the vehicle is turned on and brakes are applied after the shift lever 12 was selectively moved to the "P" shift range so as to be brought into a shift lock state, the solenoid 48 is energized. As a result, the plunger 50 is attracted to the solenoid 48 against the urging force of the return spring 52 and the stopper link 36 is rotated around the shaft 38 in the direction of arrow A in FIG. 1, so that the P engaging portion 40 is positioned apart from the block 14 in a forward direction of the block 14 (i.e., in an upper direction on the paper of FIG. 3) in a case in which the shift lever 12 is selectively moved to the "P" shift range (i.e., the state indicated by the two-dot chain line in FIG. 3). Accordingly, the shift lever 12 is brought into a shift lock-released state in which the shift lever 12 can move in the direction of the "R" shift range. This makes it possible to effect a shifting operation of the shift lever 12.

When the shift lever 12 is operated and is moved away from the "P" shift range, energization of the solenoid 48 is stopped, and the stopper link 36 returns to its original position, so that the P engaging portion 40 is positioned immediately near the block 14 and the N engaging portion 42 is positioned apart from the "N" shift range.

On the other hand, in a case in which the vehicle is running in a state in which the shift lever 12 is selectively moved to the "N" or "D" shift range, when the vehicle speed reaches a predetermined speed set in accordance with the "N" shift range, the solenoid 48 is energized again. For this reason, the stopper link 36 is rotated again and the N engaging portion 42 is brought into a state of being positioned immediately near the block 14 in a case in which the shift lever 12 is selectively moved to the "N" shift range (i.e., the state indicated by the two-dot chain line in FIG. 3). As a result, the shift lever 12 is brought into a shift lock state (i.e., a so-called R inhibit state) in which the shift lever 12 cannot move from the "N" shift range to the "R" shift range.

It should be noted that, in this state (the R inhibit state), since the N engaging portion 42 corresponds to the block 14 in a case in which the shift lever 12 is selectively moved to the "N" shift range and merely prevents the movement of the shift lever 12 in the direction of the "R" shift range, the shift lever 12 can move in each direction of the "D" and "3" shift ranges.

Further, when the vehicle speed becomes less than or equal to the predetermined speed, energization of the solenoid 48 is stopped (i.e., the solenoid 48 is released from magnetization). As a result, the stopper link 36 returns to its original position and the N engaging portion 42 moves away from the "N" shift range. Accordingly, it becomes possible that the shift lever 12 moves from the "N" shift range to the "R" shift range, so that the shift lever 12 is released from the shift lock state (i.e., the R inhibit state).

As described above, in the shift lever device 10, the shift lock operation of the shift lever 12 in each of the "P" and "N" shift positions is effected by a simple structure using the solenoid 48 which operates in accordance with a brake operation and a set vehicle speed, and the stopper link 36 moved by the solenoid 48. For this reason, a mechanism of the shift lever device 10 is simple and a small positioning space is sufficient for the shift lever 12, thereby resulting in a marked reduction in cost. Further, since the solenoid 48 operates in accordance with the vehicle speed set in each shift range so that the shift lever 12 is brought into a shift lock state, it is possible to easily set an operation timing of the solenoid 48 and reliably set the shift lever 12 in the shift lock state. An application range also largely extends. In addition, since the shift lever 12 operated in the longitudinal and transverse directions of the vehicle can be moved to a desired shift range without any other particular operation (e.g., a pushing operation of the shift lever 12, or the like), maneuverability of the shift lever 12 is not impaired.

Further, in the shift lever device 10, in a state in which the shift lever 12 is selectively positioned at any range between the "N" shift range and the "L" shift range, if electrical current is not supplied to the solenoid 48, or if the solenoid 48 does not operate even though electrical current is supplied thereto (i.e., if a so-called off-fail state occurs), the shift lever 12 can move from each range of the "N" to "L" shift ranges to the "R" shift range because the N engaging portion 42 of the stopper link 36 is separated from the "N" shift range. Accordingly, when the shift lever 12 is further operated to move from the "R" shift range to the "P" shift range, the block 14 forcedly presses the P engaging portion 40 of the stopper link 36 and moves the P engaging portion 40 against the urging force of the return spring 52, so that the shift lever 12 can be positioned in the "P" shift range. Once the shift lever 12 is positioned in the "P" shift range, the P engaging portion 40 of the stopper link 36 is again brought into a state of being positioned immediately near the block 14 by the urging force of the return spring 52. As a result, after the shift lever 12 has been once positioned in the "P" shift range after the above-described off-fail state occurred, the shift lever 12 is brought into a state in which the movement thereof from the "P" shift range to any other shift ranges (i.e., in the direction of the "R" shift range) is prevented. Accordingly, a driver can recognize the above-described failures in the state in which the shift lever 12 is positioned in the "P" shift range.

Further, if electrical current is not supplied to the solenoid 48, or if the solenoid 48 does not operate even though electrical current is supplied thereto (i.e., if a so-called off-fail state occurs), the shift lever 12 can be forcedly brought into a shift lock-released state by pressing the release button 58. Namely, when the release button 58 is pressed, the pressed portion 56 of the rod 54 is pressed and the shaft 38 is rotated. As a result, the stopper link 36 is forcedly rotated in the direction of arrow A in FIG. 2 against the urging force of the return spring 52. Accordingly, the P engaging portion 40 of the stopper link 36 is brought into a state of being positioned apart from the block 14 in the forward direction of the block 14 (i.e., in an upper direction on the paper of FIG. 3), namely, the state indicated by the two-dot chain line in FIG. 3). For this reason, the shift lever 12 can move in the direction of the "R" shift range, so as to be pulled out of the "P" shift range.

In addition, in the shift lever device 10, the P engaging portion 40 and the N engaging portion 42 of the stopper link 36, which are used to set the shift lever 12 in a locked state, are constructed so as to prevent the movement of the shift lever 12 in the transverse direction of the vehicle, i.e., the movement of the shift lever 12 in the direction perpendicular to the direction in which the solenoid 48 operates. For this reason, for example, even though the shift lever 12 set in the shift lock state is forcedly operated and moved, the operating force does not act on the solenoid 48. As a result, durability of the solenoid 48 markedly improves.

Further, in this case, when, for example, a guide member 37 is provided, as shown in FIG. 1, so as to be disposed along a direction in which the stopper link 36 moves, the guide member 37 can receive the operating force acting on the stopper link 36 if the shift lever 12 is forcedly operated as described above and durability of the entire locking mechanism improves, which is still more effective.

Next, a second embodiment of the present invention will be described.

It should be noted that the basically same components as those of the first embodiment will be denoted by the same reference numerals, and a description thereof will be omitted.

Figure 4:
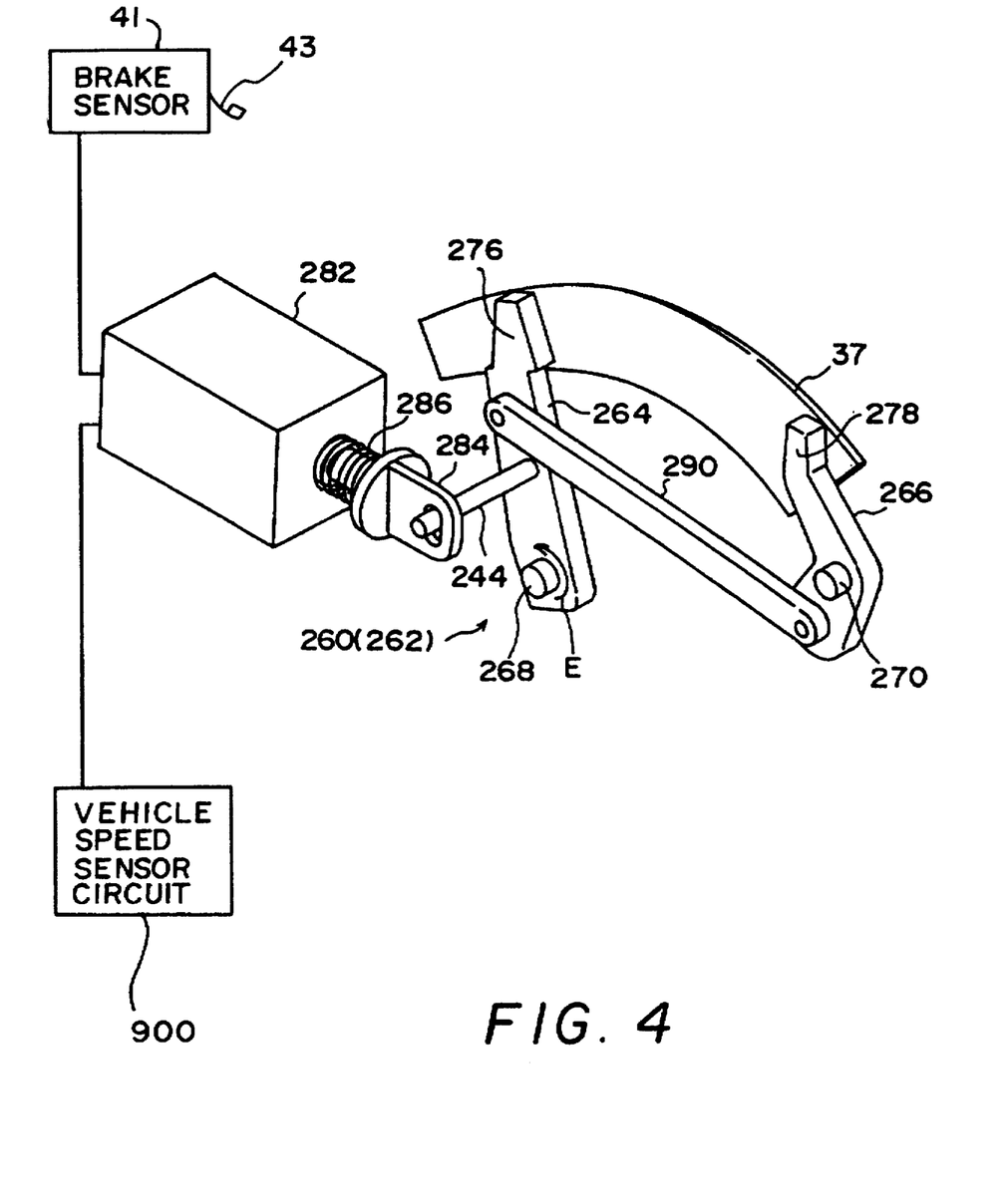
FIG. 4 is a perspective view illustrating a structure of a main portion of a shift lever device according to a second embodiment of the present invention.

FIG. 4 shows a perspective view of a main portion of a shift lever device 60 according to the second embodiment.

In this shift lever device 60, a locking device 62 is disposed in the vicinity of the block 14 of the shift lever 12.

The locking device 62 is provided with a pair of stopper links 64, 66. The pair of stopper links 64, 66 are each formed into a substantially L-shaped configuration when seen from a side view. Base end portions of these L-shaped stopper links 64, 66 are respectively supported by shafts 68, 70, so as to be freely rotatable. A projection 72 projects from a lower end portion of the L-shaped stopper link 64. Further, a connecting hole 74 is formed at a lower end portion of the L-shaped stopper link 66. The projection 72 is fitted into the connecting hole 74. As a result, the stopper link 64 and the stopper link 66 are constructed so as to interlock with each other.

An upper end portion of the stopper link 64 forms a P engaging portion 76 which, in the same way as the first embodiment, is positioned immediately near the block 14 in a case in which the shift lever 12 is selectively moved to the "P" shift range, so as to engage the block 14. Meanwhile, an upper end portion of the stopper link 66 forms an N engaging portion 78 which, in the same way as the first embodiment, is positioned immediately near the block 14 in a case in which the shift lever 12 is selectively moved to the "N" shift range, so as to engage the block 14. As a result, in the same way as the first embodiment, the second embodiment is also constructed in that the movement of the shift lever 12 in a predetermined direction can be prevented.

Figure 5:
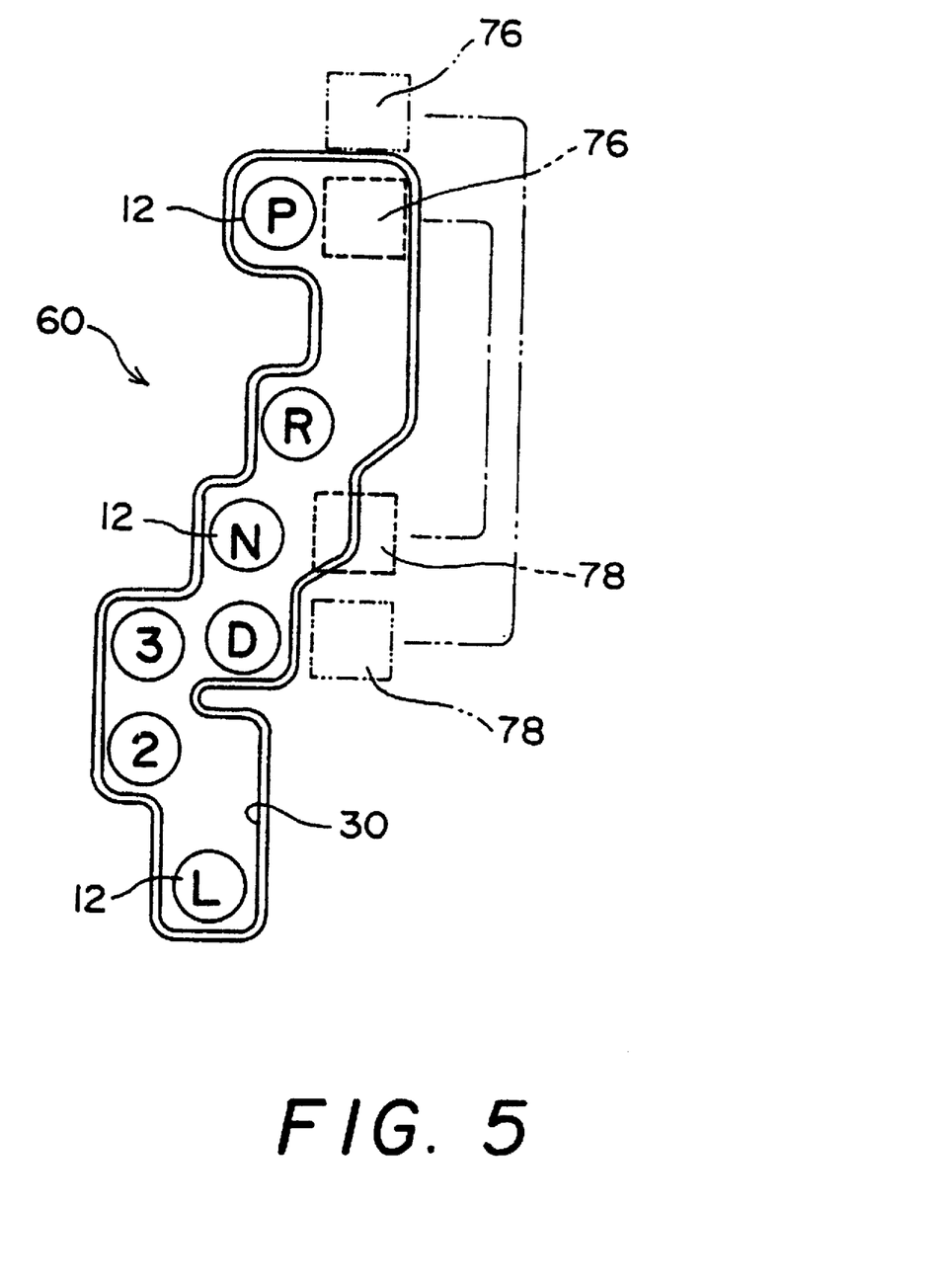
FIG. 5 is a plan view illustrating a correspondence relationship between a shift lever, guide hole and stopper link of the shift lever device according to the second embodiment of the present invention.

Here, the P engaging portion 76 of the stopper link 64 and the N engaging portion 78 of the stopper link 66 interlock with each other so as to be set in the above-described respective states. Namely, since the stopper link 64 and the stopper link 66 are connected with each other at respective lower side end portions thereof, the P engaging portion 76 and the N engaging portion 78 move close to or away from each other. For example, in a state in which the P engaging portion 76 is positioned immediately near the block 14 in a case in which the shift lever 12 is selectively moved to the "P" shift range, the N engaging portion 78 is positioned immediately near the block 14 in a case in which the shift lever 12 is selectively moved to the "N" shift range. Further, in a state in which the P engaging portion 76 is positioned apart from the block 14 in a forward direction of the block 14 (i.e., in an upper direction on the paper of FIG. 5) in a case in which the shift lever 12 is selectively moved to the "P" shift range, the N engaging portion 78 is positioned immediately near the block 14 in a case in which the shift lever 12 is selectively moved to the "D" shift range, namely, the N engaging portion 78 is separated from the shift lever 12 which is positioned in the "N" shift range).

An arm 80 extends parallel to the stopper link 64 from the shaft 68 which supports the stopper link 64. A plunger 84 of a solenoid 82 which forms an actuator is connected to the arm 80. The solenoid 82 is adapted to attract the plunger 84 when electrical current is supplied to the solenoid 82. When electrical current is not supplied, the plunger 84 is pulled out by an urging force of a coiled return spring 86. When the solenoid 82 has been magnetized, the plunger 84 is attracted to the solenoid 82 against the urging force of the return spring 86, so that the stopper link 64 is rotated around the shaft 68 in the direction of arrow B in FIG. 4. Accordingly, when electrical current is not supplied to the solenoid 82, the P engaging portion 76 of the stopper link 64 is positioned immediately near the block 14 in a case in which the shift lever 12 is selectively moved to the "P" shift range, and the N engaging portion 78 of the stopper link 66 is positioned immediately near the block 14 in a case in which the shift lever 12 is selectively moved to the "N" shift range. On the other hand, when electrical current is supplied to the solenoid 82 and the stopper link 64 is rotated in the direction of arrow B in FIG. 4, the stopper link 66 is also moved together with the stopper link 64. Thus, the P engaging portion 76 is positioned apart from the block 14 in a forward direction of the block 14 (i.e., in an upper direction on the paper of FIG. 5) in a case in which the shift lever 12 is selectively moved to the "P" shift range and the N engaging portion 78 is positioned immediately near the block 14 in a case in which the shift lever 12 is selectively moved to the "D" shift range, namely, the N engaging portion 78 is positioned apart from the "N" shift range.

The solenoid 82 is adapted, in the same way as the first embodiment, to be magnetized by energization and to be released from magnetization by electric control in accordance with a running condition of the vehicle. Concretely, the solenoid 82 is set in a non-energized state when the shift lever 12 is selectively moved to the "P" shift range and when a brake operation is applied, the solenoid 82 is energized (magnetized). Further, in a case in which the shift lever 12 is selectively moved to any shift range between the "N" shift range and the "L" shift range, when the vehicle speed reaches a predetermined speed set in accordance with each shift range, the solenoid 82 stops (i.e., is released from being magnetized). Further, when the vehicle speed becomes less than or equal to the predetermined speed, the solenoid 82 is adapted to operate.

Next, an operation of the second embodiment will be described.

In the shift lever device 60 having the above-described structure as well, the shift lever 12 is operated in the longitudinal and transverse directions of the vehicle so that any of the shift ranges is selected. Further, when the shift lever is positioned in a specific shift range or when the vehicle is running, the solenoid 82 operates so that the stopper link 64 is moved to a position in which the stopper link 64 can engage the shift lever 12 (the block 14).

Namely, for example, when the shift lever 12 is selectively moved to the "P" shift range, the solenoid 82 is stopped (i.e., the solenoid 82 is released from being magnetization), and the plunger 84 is pulled out by the urging force of the return spring 86. Therefore, the P engaging portion 76 of the stopper link 64 is positioned immediately near the block 14 in a case in which the shift lever 12 is selectively moved to the "P" shift range and the N engaging portion 78 of the stopper link 66 is positioned immediately near the block 14 in a case in which the shift lever 12 is selectively moved to the "N" shift range (which is the state indicated by the broken line in FIG. 5). Accordingly, the shift lever 12 is brought into a shift lock state in which the movement of the shift lever 12 to other shift ranges than the "P" shift range (i.e., the movement of the shift lever 12 in the direction of the "R" shift range) is prevented (which is referred to as a so-called P range shift lock state).

On the other hand, when an ignition switch of the vehicle is turned on and brakes are applied after the shift lever 12 was selectively moved to the "P" shift range so as to be set in the shift lock state, the solenoid 82 is energized. As a result, the plunger 84 is attracted to the solenoid 82 against the urging force of the return spring 86 and the stopper link 64 and the stopper link 66 are rotated, so that the P engaging portion 76 is set in a state of being separated from the block 14 in a forward direction of the block 14 (i.e., in an upper direction on the paper of FIG. 5) in a case in which the shift lever 12 is selectively moved to the "P" shift range, i.e., the state indicated by the two-dot chain line in FIG. 5. Accordingly, the shift lever 12 is set in a shift lock-released state in which the shift lever 12 can move in the direction of the "R" shift range. This makes it possible to effect a shifting operation of the shift lever 12.

On the other hand, in a case in which the vehicle is running in a state in which the shift lever 12 is selectively moved to the "N" or "D" shift range, when the vehicle speed reaches a predetermined speed set in accordance with the "N" shift range, the solenoid 82 is stopped (released from magnetization). For this reason, the stopper link 64 and the stopper link 66 are rotated again and the N engaging portion 78 is brought into a state of being positioned immediately near the block 14 in a case in which the shift lever 12 is selectively moved to the "N" shift range (i.e., the state indicated by the broken line in FIG. 5). As a result, the shift lever 12 is set in the shift lock state (which is referred to as a so-called R inhibit state) in which the movement of the shift lever 12 from the "N" shift range to the "R" shift range is prevented.

It should be noted that, in this state (the R inhibit state), since the N engaging portion 78 corresponds to the block 14 in a case in which the shift lever 12 is selectively moved to the "N" shift range and merely prevents the movement of the shift lever 12 in the direction of the "R" shift range, the shift lever 12 can move in each direction of the "D" and "3" shift ranges.

Further, when the vehicle speed becomes less than or equal to the predetermined speed, the solenoid 82 is energized (magnetized). As a result, the stopper link 64 and the stopper link 66 are rotated again and the N engaging portion 78 is moved away from the "N" shift range. Accordingly, it becomes possible that the shift lever 12 moves from the "N" shift range to the "R" shift range, so that the shift lever 12 is released from the shift lock state (the R inhibit state).

As described above, in the shift lever device 60 as well, the shift lock operation of the shift lever 12 in each of the "P" and "N" shift positions is effected by a simple structure using the solenoid 82 which operates in accordance with a brake operation and a set vehicle speed, and the stopper links 64, 66 moved by the solenoid 82. For this reason, a mechanism of the shift lever device 60 is simple and a small positioning space is sufficient for the shift lever 12, thereby resulting in a marked reduction in cost. Further, since the solenoid 82 operates in accordance with the vehicle speed set in each shift range so that the shift lever 12 is brought into the shift lock state, it is possible to easily set an operation timing of the solenoid 82 and reliably set the shift lever 12 in the shift lock state. An application range also largely extends. In addition, since the shift lever 12 operated in the longitudinal and transverse directions of the vehicle can be moved to a desired shift range without any other particular operation (e.g., a pushing operation of the shift lever or the like), maneuverability of the shift lever 12 is not impaired.

In addition, in the shift lever device 60 as well, in the same manner as the first embodiment, the P engaging portion 76 of the stopper link 64 and the N engaging portion 78 of the stopper link 66, which are used to set the shift lever 12 in a locked state, are constructed so as to prevent the movement of the shift lever 12 in the transverse direction of the vehicle, i.e., the movement of the shift lever 12 in the direction perpendicular to the direction in which the solenoid 82 operates. For this reason, for example, even though the shift lever 12 set in the shift lock state is forcedly operated and moved, the operating force does not act on the solenoid 82. As a result, durability of the solenoid 82 markedly improves.

Further, in this case, when, for example, a guide member 37 is provided, as shown in FIG. 4, so as to be disposed along a direction in which the stopper links 64, 66 move, the guide member 37 can receive the operating force acting on the stopper links 64, 66 if the shift lever 12 is forcedly operated as described above and durability of the entire locking mechanism improves, which is still more effective.

Figure 6:
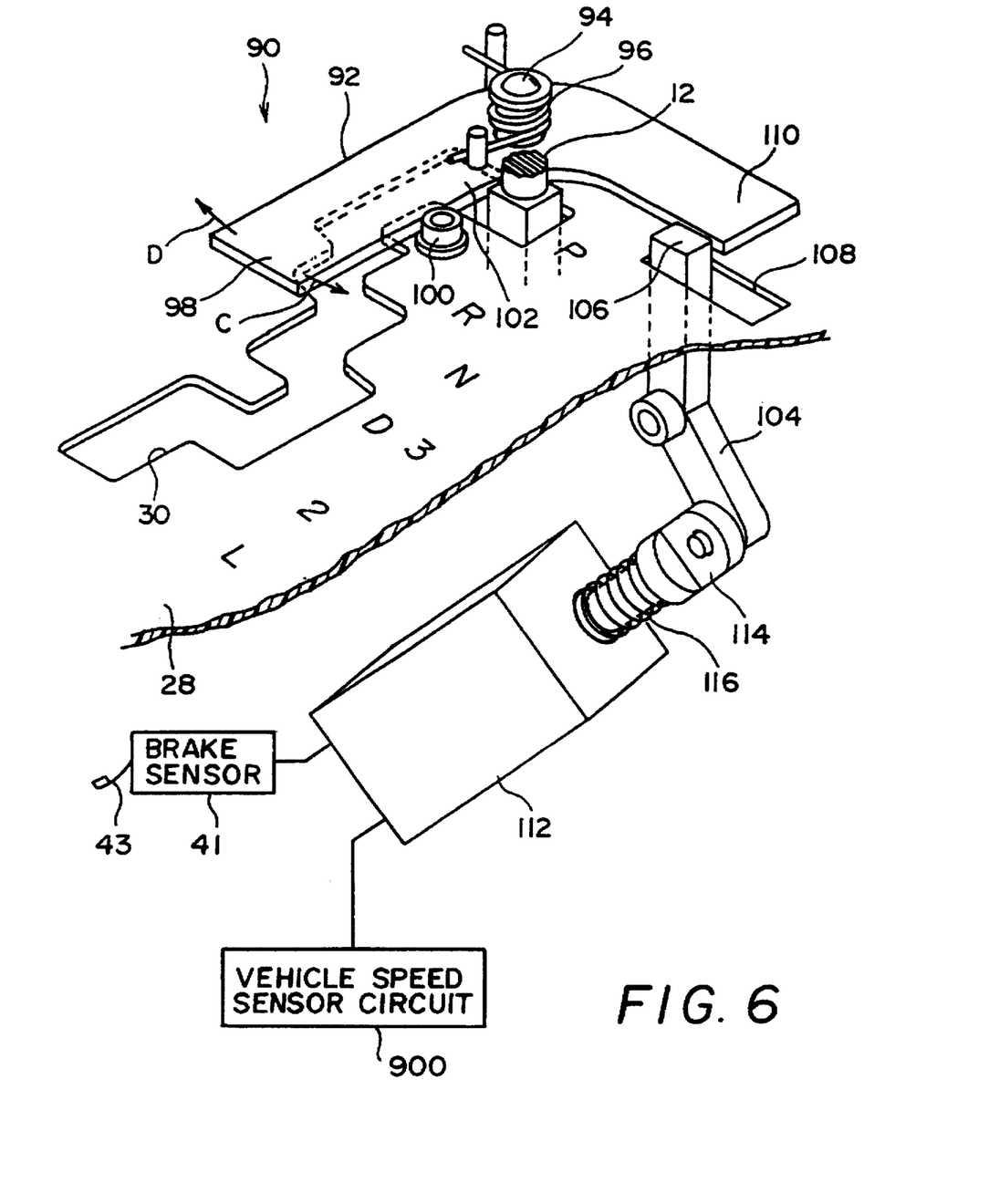
FIG. 6 is a perspective view illustrating a structure of a main portion of a shift lever device according to a third embodiment of the present invention.

Next, FIG. 6 shows a perspective view of a main portion of a shift lever device 90 according to a third embodiment of the present invention.

In the shift lever device 90, a lock plate 92 is disposed in the vicinity of a guide hole 30 formed in the plate 28.

The lock plate 92 is formed into a substantially L-shaped configuration when seen from a plan view. A base end portion of the L-shaped configuration is supported by a shaft 94 so as to be rotatable. A helical spring 96 is coiled around the shaft 94 so that one leading end portion 98 of the L-shaped configuration is constantly urged in a direction in which the leading end portion 98 moves close to the guide hole 30 (i.e., the direction of arrow C in FIG. 6). Further, a rubber cushion 100 is disposed on the plate 28. The lock plate 92 urged so as to move close to the guide hole 30 abuts and is retained by the rubber cushion 100. In the state in which the lock plate 92 abuts and is retained by the rubber cushion 100, the leading end portion 98 of the L-shaped lock plate 92 is positioned in (reaches) the "N" shift range of the guide hole 30. For this reason, the leading end portion 98 can engage the shift lever 12 selectively moved to the "N" shift range. Further, in the above-described state, an intermediate portion 102 of the L-shaped lock plate 92 corresponds to the "P" shift range of the guide hole 30. For this reason, the intermediate portion 102 can engage the shift lever 12 selectively moved to the "P" shift range.

Meanwhile, a stopper link 104 is disposed on a reverse side of the plate 28 so as to be rotatable. An upper end portion of the stopper link 104 forms an engaging portion 106 which projects above the plate 28 from a through hole 108 formed in the plate 28. The engaging portion 106 can move between one end of the hole 108 (i.e., the end in which the engaging portion 106 moves close to the lock plate 92) and the other end of the engaging portion 106 (i.e., the end in which the engaging portion 106 is separated from the lock plate 92). In a state in which the engaging portion 106 is positioned at the end of the hole 108 in which the engaging portion 106 moves close to the lock plate 92, the engaging portion 106 can engage the other leading end portion 110 of the L-shaped lock plate 92. Namely, in the state in which the engaging portion 106 is positioned at this one end of the hole 108, the engaging portion 106 engages the other leading end portion 110 of the L-shaped lock plate 92 and the movement of the lock plate 92 in the direction of arrow D in FIG. 6 (i.e., each movement of the leading end portion 98 and the intermediate portion 102 of the lock plate 92 in the direction in which they move away from the guide hole S0). Accordingly, in this state, when the shift lever 12 is selectively moved to the "P" shift range or the "N" shift range, the movement of the shift lever 12 in a predetermined direction can be prevented.

Meanwhile, a plunger 114 of a solenoid 112 which forms an actuator is connected to a lower end portion of the stopper link 104. The solenoid 112 is adapted to attract the plunger 114 when electrical current is supplied to the solenoid 112. When electrical current is not supplied thereto, the plunger 114 is pulled out by an urging force of the coiled return spring 116. When the solenoid 112 has been magnetized, the plunger 114 is attracted to the solenoid 112 against the urging force of the return spring 116 so that the stopper link 104 is moved, and the engaging portion 106 can be positioned at the end of the hole 106, in which the engaging portion 106 is separated from the lock plate 92.

The solenoid 112 is adapted, in the same way as the first and second embodiment, to be magnetized by energization and to be released from magnetization by electric control in accordance with a running condition of the vehicle. Concretely, the solenoid 112 is set in a stopped state (magnetization released state) when the shift lever 12 is selectively moved to the "P" shift range and when a brake operation is applied, the solenoid 112 is energized (magnetized). Further, in a case in which the shift lever 12 is selectively moved to any shift range between the "N" shift range and the "L" shift range, when the vehicle speed reaches a predetermined speed set in accordance with each shift range, the solenoid 112 is stopped (i.e., released from being magnetized). Further, when the vehicle speed becomes less than or equal to the predetermined speed, the solenoid 112 is adapted to operate.

Next, an operation of the third embodiment will be described.

In the shift lever device 90 having the above-described structure as well, the shift lever 12 is operated in the longitudinal and transverse directions of the vehicle so that any of the shift ranges is selected. Further, when the shift lever is positioned in a specific shift range or when the vehicle is running, the solenoid 112 operates and the stopper link 104 is moved.

Namely, for example, when the shift lever 12 is selectively moved to the "P" shift range, the solenoid 112 is set in a non-energized state so that the plunger 114 projects and the stopper link 104 is rotated. As a result, the engaging portion 106 of the stopper link 104 is positioned at the end of the hole 108, in which the engaging portion 106 moves close to the lock plate 92. Accordingly, the rotation of the lock plate 92 in the direction of arrow D in FIG. 6 is prevented and the shift lever 12 positioned in the "P" shift range of the guide hole 30 is brought into the shift lock state (i.e., the P range shift lock state) in which the movement of the shift lever 12 to other shift ranges than the "P" shift range (i.e., the movement in the direction of the "R" shift range) is prevented by the intermediate portion 102 of the lock plate 92.

On the other hand, when an ignition switch of the vehicle is turned on and brakes are applied after the shift lever 12 was selectively moved to the "P" shift range so as to be set in the shift lock state, the solenoid 112 is energized. As a result, the plunger 114 is attracted to the solenoid 112 against the urging force of the return spring 116 and the stopper link 104 is rotated, so that the engaging portion 106 is positioned at the other end of the through hole 108, in which the engaging portion 106 is separated from the lock plate 92. Accordingly, the shift lever 12 is set in a shift lock-released state in which the lock plate 92 can rotate in the direction of arrow D in FIG. 6. When the shift lever 12 positioned in the "P" shift range of the guide hole 30 presses the intermediate portion 102 of the lock plate 92 so as to rotate the lock plate 92, the shift lever 12 can move from the "P" shift range to the "R" shift range, further to the "N" or "D" shift range. This makes it possible to effect a shifting operation of the shift lever 12.

Meanwhile, in a case in which the vehicle is running in a state in which the shift lever 12 is selectively moved to the "N" or "D" shift range, when the vehicle speed reaches a predetermined speed set in accordance with the "N" shift range, the solenoid 112 is stopped again. For this reason, the stopper link 104 is rotated again and the engaging portion 106 is positioned at the end of the through hole 108 in which the engaging portion 106 moves close to the lock plate 92, so that the rotation of the lock plate 92 in the direction of arrow D in FIG. 6 is prevented. As a result, the shift lever 12 is set in the shift lock state (which is referred to as a so-called R inhibit state) in which the movement of the shift lever 12 from the "N" shift range to the "R" shift range is prevented.

It should be noted that, in this state (the R inhibit state), since the leading end portion 98 of the lock plate 92 merely reaches the "N" shift range of the guide hole 30 and merely prevents the movement of the shift lever which is selectively moved to the "N" shift range, in the direction of the "R" shift range, the shift lever 12 can move in each direction of the "D" and "3" shift ranges.

Further, when the vehicle speed becomes less than or equal to the predetermined speed, the solenoid 112 is energized (magnetized) again. As a result, the stopper link 104 is rotated again and the engaging portion 106 is positioned at the end of the through hole 108 in which the engaging portion 106 is separated from the lock plate 92. Accordingly, it becomes possible that the shift lever 12 is set in the shift lock-released state in which the lock plate 92 can rotate in the direction of arrow D in FIG. 6. For this reason, when the shift lever 12 positioned in the "N" shift range of the guide hole 30 presses the leading end portion 98 of the lock plate 92 so as to rotate the lock plate 92, the shift lever 12 can move from the "N" shift range to the "R" shift range, further to the "P" shift range. Thus, the shift lever 12 is released from the shift lock state (the R inhibit state).

As described above, in the shift lever device 90 as well, the shift lock operation of the shift lever 12 in each of the "P" and "N" shift positions is effected by a simple structure using the solenoid 112 which operates in accordance with a brake operation and a set vehicle speed, and the stopper link 104 moved by the solenoid 112. For this reason, a mechanism of the shift lever device 90 is simple and a small positioning space is sufficient for the shift lever 12, thereby resulting in a marked reduction in cost. Further, since the solenoid 112 operates in accordance with the vehicle speed set in each shift range so that the shift lever 12 is brought into the shift lock state, it is possible to easily set an operation timing of the solenoid 112 and reliably set the shift lever 12 in the shift lock state. An application range also largely extends. In addition, since the shift lever 12 operated in the longitudinal and transverse directions of the vehicle can be moved to a desired shift range without any other particular operation (e.g., a pushing operation of the shift lever 12, or the like), maneuverability of the shift lever 12 is not impaired.

In addition, in the shift lever device 90 as well, in the same manner as the first and second embodiments, the stopper link 104 which is used to set the shift lever 12 in a locked state is constructed so as to prevent the movement of the shift lever 12 in the direction different from that in which the solenoid 112 operates. For this reason, for example, even though the shift lever 12 set in the shift lock state is forcedly operated and moved, the operating force does not act on the solenoid 112. As a result, durability of the solenoid 112 markedly improves.

In addition, even in this case, since the stopper link 104 (engaging portion 106) is guided by the through hole 108, force acting on the stopper link 104 when the shift lever 12 is forcedly operated as described above is received by a circumferential wall of the through hole 108 (plate 28) and durability of the entire locking mechanism improves, which is still more effective.

It should be noted that, although, in each of the above-described embodiments, the shift lever device 10 was described which is used for a so-called four-stage automatic transmission having "3" and "2" shift ranges between the "D" shift range and the "L" shift range, the present invention is not limited to the same and it can be applied to a so-called five- or three-stage automatic transmission.

Next, a fourth embodiment of the present invention will be described.

The fourth embodiment is basically the same as the above-described second embodiment. However, the second embodiment is constructed in that the stopper link 64 and the stopper link 66 interlocks with each other by causing the projection 72 disposed at the lower end portion of the L-shaped configuration of the stopper link 64 to be fitted into the connecting hole 74. Instead of this construction, in the fourth embodiment, a stopper lever 264 and a stopper lever 266 interlock with each other by connecting the stopper lever 264 and the stopper lever 266 by a connecting lever 290. It should be noted that the basically same components as those of the second embodiment will be denoted by the same reference numerals, and a description thereof will be omitted.

Figure 7:
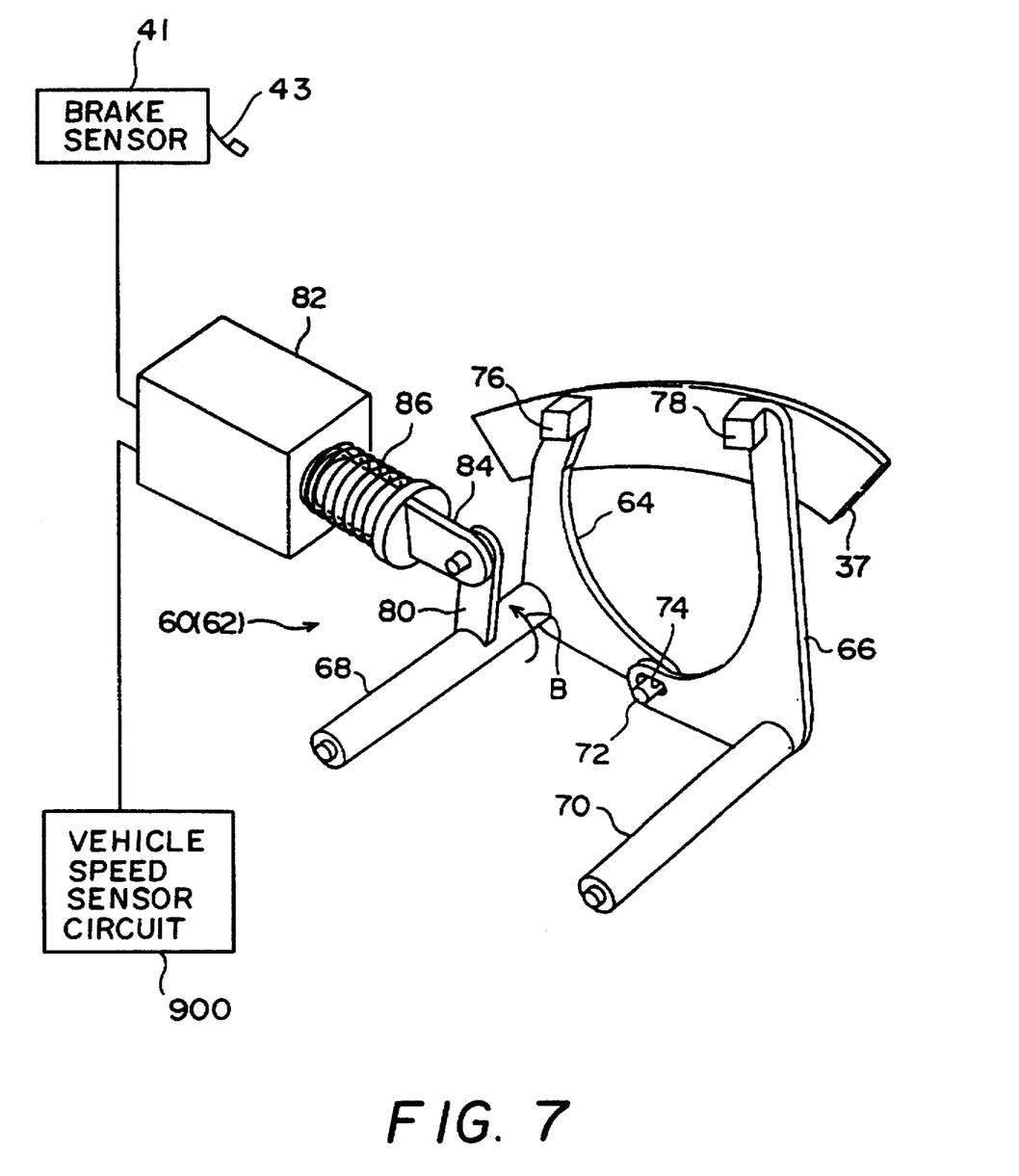
FIG. 7 is a perspective view illustrating a structure of a main portion of a shift lever device according to a fourth embodiment of the present invention.

FIG. 7 shows a perspective view of a main portion of a shift lever device 260 according to the fourth embodiment.

In the shift lever device 260, a lock device 262 is disposed in the vicinity of the block 14 of the shift lever 12.

The locking device 262 is provided with a pair of stopper levers 264, 266, and a connecting lever 290 for connecting the pair of stopper levers 264, 266 with each other. The stopper lever 264 is formed into an elongated flat plate. One end portion of the stopper lever 264 is supported by a shaft 268 so as to be rotatable. The other end portion of the stopper lever 264 forms a P engaging portion 276. In the same way as the second embodiment, the P engaging portion 276 is positioned immediately near the block 14 in a case in which the shift lever 12 is selectively moved to the "P" shift range and can abut the block 14. The stopper lever 266 is formed so as to bend at an intermediate portion thereof (i.e., formed into a substantially V-shaped configuration). The intermediate portion of the stopper lever 266 is supported by a shaft 270 so as to be rotatable. One end portion of the stopper lever 266 forms an N engaging portion 278. In the same way as the second embodiment, the N engaging portion 278 is positioned immediately near the block 14 when the shift lever 12 is selectively moved to the "N" shift range and can abut the block 14. The fourth embodiment is constructed such that, in the same way as the second embodiment, the movement of the shift lever 12 in a predetermined direction can be prevented by the P engaging portion 276 and the N engaging portion 278.

One end portion of the connecting lever 290 is mounted to the stopper lever 264 on the side near the P engaging portion 276 other than the longitudinally intermediate portion of the stopper lever 264, so as to be rotatable. The other end portion of the connecting lever 290 is mounted to an end portion of the stopper lever 266, in which the N engaging portion 278 is not formed. The connecting lever 290 is formed of an elongated straight-line flat plate member and connects the stopper lever 264 and the stopper lever 266 with each other by the above-described construction.

Here, the P engaging portion 276 of the stopper lever 264 and the N engaging portion 278 of the stopper lever 266 interlock with each other in the same way as the second embodiment. Namely, since the stopper lever 264 and the stopper lever 266 are connected by the connecting lever 290, the P engaging portion 276 and the N engaging portion 278 moves close to and away from each other in the same way as the second embodiment.

Figure 8:
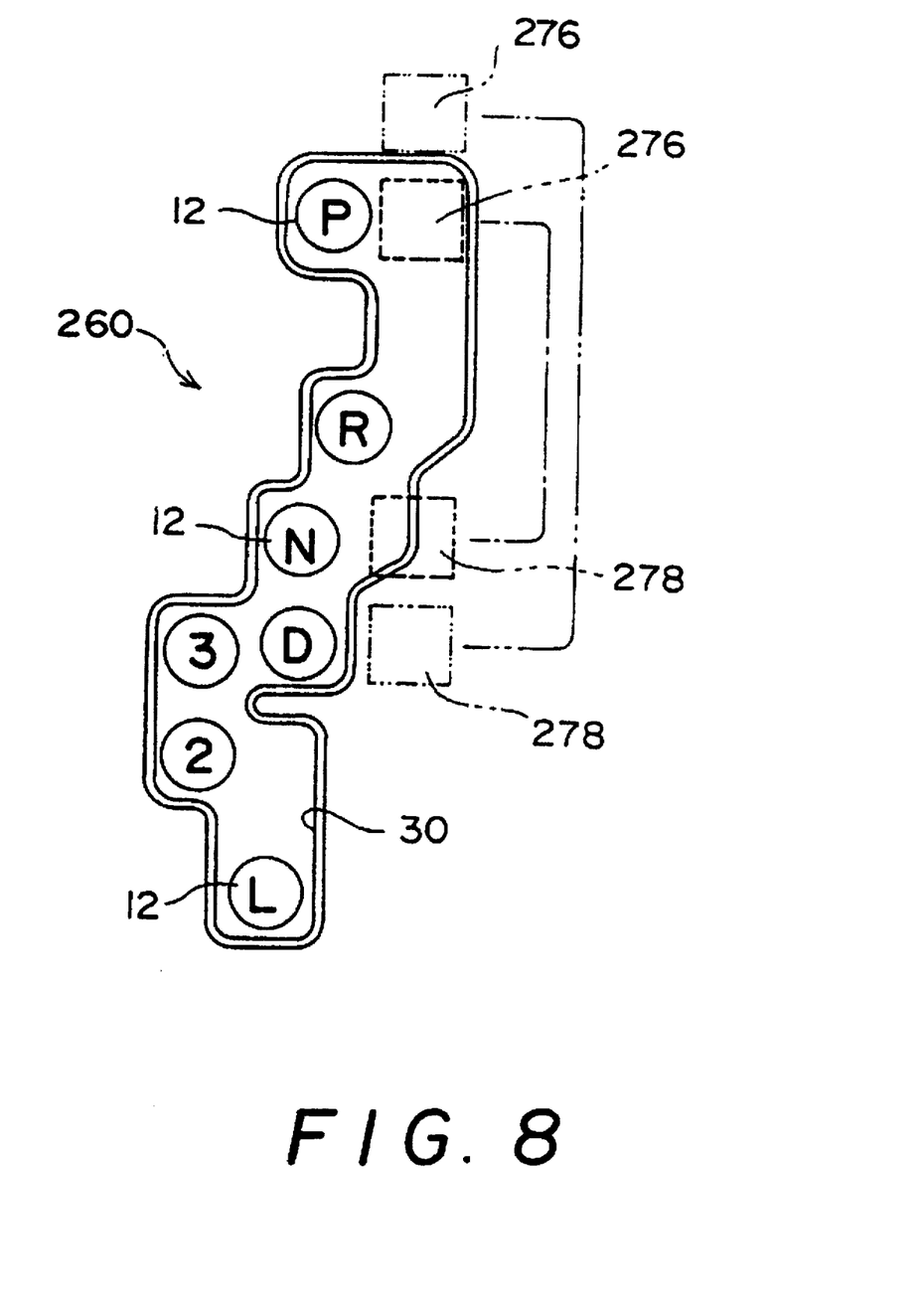
FIG. 8 is a plan view illustrating a correspondence relationship between a shift lever, guide hole and stopper link of the shift lever device according to the fourth embodiment of the present invention.

An arm 244 is mounted to a longitudinally intermediate portion of the stopper lever 264 so as to be disposed perpendicular to the stopper lever 264. A plunger 284 of a solenoid 282 which forms an actuator is connected to the arm 244. The solenoid 282 is adapted to attract the plunger 284 when electrical current is supplied to the solenoid 282. When electrical current is not supplied thereto, the plunger 284 is pulled out by an urging force of a coiled return spring 286. When the solenoid 282 has been magnetized, the plunger 284 is attracted to the solenoid 282 against the urging force of the return spring 286 so that the stopper lever 264 is rotated around the shaft 268 in the direction of arrow E in FIG. 7. Accordingly, when electrical current is not supplied to the solenoid 282, the P engaging portion 276 of the stopper lever 264 is positioned immediately near the block 14 in a case in which the shift lever 12 is selectively moved to the "P" shift range and the N engaging portion 278 of the stopper lever 266 is positioned immediately near the block 14 in a case in which the shift lever 12 is selectively moved to the "N" shift range (see FIG. 8). On the other hand, when the solenoid 282 is energized and the stopper lever 264 is rotated in the direction of arrow E in FIG. 7 as described above, the stopper lever 266 is also rotated together with the stopper lever 264. Further, the P engaging portion 276 is positioned apart from the block 14 in a forward direction of the block 14 (i.e., in an upper direction on the paper of FIG. 8) in a case in which the shift lever 12 is selectively moved to the "P" shift range, and the N engaging portion 278 is positioned immediately near the block 14 in a case in which the shift lever 12 is selectively moved to the "D" shift range (namely, the N engaging portion 278 is positioned apart from the "N" shift range) (see FIG. 8).

The solenoid 282 is adapted, in the same way as the above-described second embodiment, to be magnetized by energization and to be released from magnetization by electric control in accordance with a running condition of the vehicle. Concretely, the solenoid 282 is set in a non-energized state when the shift lever 12 is selectively moved to the "P" shift range and when a brake operation is applied, the solenoid 282 is energized (magnetized). Further, in a case in which the shift lever 12 is selectively moved to any shift range between the "N" shift range and the "L" shift range, when the vehicle speed reaches a predetermined speed set in accordance with each shift range, the solenoid 282 stops (i.e., is released from being magnetized). Further, when the vehicle speed becomes less than or equal to the predetermined speed, the solenoid 282 is adapted to operate.

An operation of the fourth embodiment will be described hereinafter.

In the shift lever device 260 having the above-described structure as well, the shift lever 12 is operated in the longitudinal and transverse directions of the vehicle so that any of the shift ranges is selected. Further, when the shift lever is positioned in a specific shift range or when the vehicle is running, the solenoid 282 operates so that the stopper link 264 is moved to a position in which the stopper link 264 can abut the shift lever 12 (the block 14).

It should be noted that the following concrete cases are the same as those of the second embodiment, and a description thereof will be omitted: (1) the case in which the shift lever 12 is selectively moved to the "P" shift range; (2) the case in which an ignition switch of the vehicle is turned on and brakes are applied after the shift lever 12 was selectively moved to the "P" shift range so as to be brought into the shift lock state; (3) the case in which the vehicle speed reaches a predetermined speed set in accordance with the "N" shift range When the vehicle is running in a state in which the shift lever 12 is selectively moved to the "N" or "D" shift range; and (4) thereafter, the case in which the vehicle speed becomes lower than the predetermined speed.

As described above, in the shift lever device 260 as well, the shift lock operation of the shift lever 12 in each of the "P" and "N" shift positions is effected by a simple structure using the solenoid 282 which operates in accordance with a brake operation and a set vehicle speed, and the stopper links 264, 266 moved by the solenoid 282. For this reason, a mechanism of the shift lever device 260 is simple and a small positioning space is sufficient for the shift lever 12, thereby resulting in a marked reduction in cost. Further, since the solenoid 282 operates in accordance with the vehicle speed set in each shift range so that the shift lever 12 is brought into the shift lock state, it is possible to easily set an operation timing of the solenoid 282 and reliably set the shift lever 12 in the shift lock state. An application range also largely extends. In addition, since the shift lever 12 operated in the longitudinal and transverse directions of the vehicle can be moved to a desired shift range without any other particular operation (e.g., a pushing operation of the shift lever 12, or the like), maneuverability of the shift lever 12 is not impaired.

In addition, in the shift lever device 260 as well, in the same manner as the second embodiment, the P engaging portion 276 of the stopper link 264 and the N engaging portion 278 of the stopper link 266, which are used to set the shift lever 12 in a locked state, are constructed so as to prevent the movement of the shift lever 12 in the transverse direction of the vehicle, i.e., the movement of the shift lever 12 in the direction perpendicular to the direction in which the solenoid 282 operates. For this reason, for example, even though the shift lever 12 set in the shift lock state is forcedly operated and moved, the operating force does not act on the solenoid 282. As a result, durability of the solenoid 282 markedly improves.

Further, in this case as well, when, for example, a guide member 37 is provided, as shown in FIG. 7, so as to be disposed along a direction in which the stopper links 264, 266 move, the guide member 37 can receive the operating force acting on the stopper links 264, 266 if the shift lever 12 is forcedly operated as described above and durability of the entire locking mechanism improves, which is still more effective.

What is claimed is:

1. A shift lever device adapted for use with a transmission having a plurality of shift ranges including a P shift range, R shift range, N shift range, D shift range, L shift range, and at least one intermediate shift range provided between said D shift range and said L shift range, said shift lever device comprising:

a shift lever adapted to be connected to the transmission and operated in longitudinal and transverse directions of a vehicle so as to be selectively moved to any one of said plurality of shift ranges and shift-operate the transmission;

a brake activation device;

brake sensor means connected with said brake activation device for sensing when said brake activation device is operated and for generating a brake indicating signal in response thereto;

vehicle speed sensing means for sensing a vehicle speed and for generating a vehicle speed signal indicating said vehicle speed;

a stopper for preventing movement of said shift lever by abutting said shift lever so as to receive and stop said shift lever, said stopper having a P shift range abutting portion and an N shift range abutting portion, the shift lever device operating such that said P shift range abutting portion is positioned to abut said shift lever when the N shift range abutting portion is positioned to abut said shift lever, and said P shift range abutting portion is positioned to not abut said shift lever when said N shift range abutting portion is positioned to not abut said shift lever, and when movement of said shift lever is prevented, said stopper prevents movement of said shift lever from said P shift range to shift ranges other than said P shift range and prevents movement of said shift lever from said N shift range to said R shift range; and an actuator connected to said stopper, said brake sensor means, and said vehicle speed sensing means, said actuator operating, when said shift lever is selectively moved to said P shift range, in response to said brake indicating signal and said actuator moving said stopper to a position in which said shift lever positioned in said P shift range is released from a shift lock state, and said actuator further operating, when said shift lever is selectively moved to any range between said N shift range and said L shift range, in response to said vehicle speed signal set in accordance with each shift range between said N shift range and said L shift range and said actuator moving said stopper to a position in which the movement of said shift lever from said N shift range to said R shift range is prevented.

2. A shift lever device according to claim 1, wherein said stopper abuts and catches said shift lever, so as to prevent the movement of said shift lever.

3. A shift lever device according to claim 2, wherein said stopper has each extended abutment portion for the P shift range and the N shift range.

4. A shift lever device according to claim 3, wherein said extended abutment portions are each provided with a projection for abutment.

5. A shift lever device according to claim 3, wherein said stopper is constructed in that said abutment portions for the P and N shift ranges which are formed of an integral member are disposed such that: (1) when the abutment portion for the P shift range is separated from a position in which the abutment portion for the P shift range can abut said shift lever, the abutment portion for the N shift range is positioned at a position in which the abutment portion for the N shift range can abut said shift lever; and (2) when the abutment portion for the P shift range is positioned at a position in which the abutment portion for the P shift range can abut said shift lever, the abutment portion for the N shift range is separated from a position in which the abutment portion for the N shift range can abut said shift lever.

6. A shift lever device according to claim 5, wherein said actuator operates such that, when electrical current is supplied to said actuator, said abutment portions are set in the respective states of said (1), and when electrical current is not supplied to said actuator, said abutment portions are set in the respective states of said (2).

7. A shift lever device according to claim 5, wherein said stopper is formed into a flat plate and abuts said shift lever from a thickness direction of said stopper.

8. A shift lever device according to claim 5, further comprising:

a forced release mechanism which forcedly actuates said actuator at an arbitrary time.

9. A shift lever device according to claim 5, wherein a direction in which said actuator operates is different from a direction in which said stopper abuts said shift lever.

10. A shift lever device according to claim 5, further comprising:

a guide member which is disposed along a direction in which said stopper moves and which receives force acting on said stopper.

11. A shift lever device according to claim 3, wherein said stopper is constructed in that said abutment portions for the P shift range and the N shift range which are respectively formed from separate members and which interlock with each other are disposed in that: (1) when the abutment portion for the P shift range is not positioned at a position in which the abutment portion for the P shift range can abut said shift lever, the abutment portion for the N shift range is not positioned at a position in which the abutment portion for the N shift range can abut said shift lever; and (2) when the abutment portion for the P shift range is positioned at the position in which the abutment portion for the P shift range can abut said shift lever, the abutment portion for the N shift range is positioned at the position in which the abutment portion for the N shift range can abut said shift lever.

12. A shift lever device according to claim 11, wherein said actuator operates such that, when electrical current is supplied to said actuator, said abutment portions are set in the respective states of said (1), and when electrical current is not supplied to said actuator, said abutment portions are set in the respective states of said (2).

13. A shift lever device according to claim 11, wherein said abutment portion for the P shift range and said abutment portion for the N shift range are constructed so as to be connected with each other by a link mechanism to interlock with each other.

14. A shift lever device according to claim 11, wherein a direction in which said actuator operates is different from a direction in which said stopper abuts said shift lever.

15. A shift lever device according to claim 11, further comprising:

a guide member which is disposed along a direction in which said stopper moves and which receives force acting on said stopper.

16. A shift lever device according to claim 2, wherein said stopper has abutment portions for the P and N shift ranges, which are formed integrally with each other, and when said stopper abuts said shift lever and said actuator operates such that said stopper does not catch said shift lever, said shift lever can move from the P shift range to other shift ranges and from the N shift range to the R shift range, and when said stopper abuts said shift lever and said actuator operates such that said stopper catches said shift lever, said shift lever cannot move from the P shift range to other shift ranges and from the N shift range to the R shift range.

17. A shift lever device according to claim 16, wherein said stopper is disposed so as to move in a path in which said shift lever moves from the P shift range of a guide path of a guide plate and a path in which said shift lever moves from the N shift range to the R shift range.

18. A shift lever device according to claim 17, wherein said stopper abuts said shift lever in the direction in which said stopper moves in the guide path of said guide plate.

19. A shift lever device according to claim 18, wherein said stopper is urged in a direction in which said stopper abuts said shift lever.

20. A shift lever device according to claim 18, wherein said stopper rotates around an axis perpendicular to said guide plate so as to be movable in said guide path.

21. A shift lever device according to claim 20, wherein an operating end of said actuator is connected to an actuator body so as to be rotatable and a rotation axis of said operating end is disposed along a direction different from that in which a rotation axis of said stopper is disposed.

22. A shift lever device according to claim 16, wherein said operating end of said actuator is guided by a hole formed in said guide plate.

* * * * *